(No Model.)
A. G. WATERHOUSE.
REGULATION OF ELECTRIC MOTORS.
No. 387,195. Patented July 31, 1888.
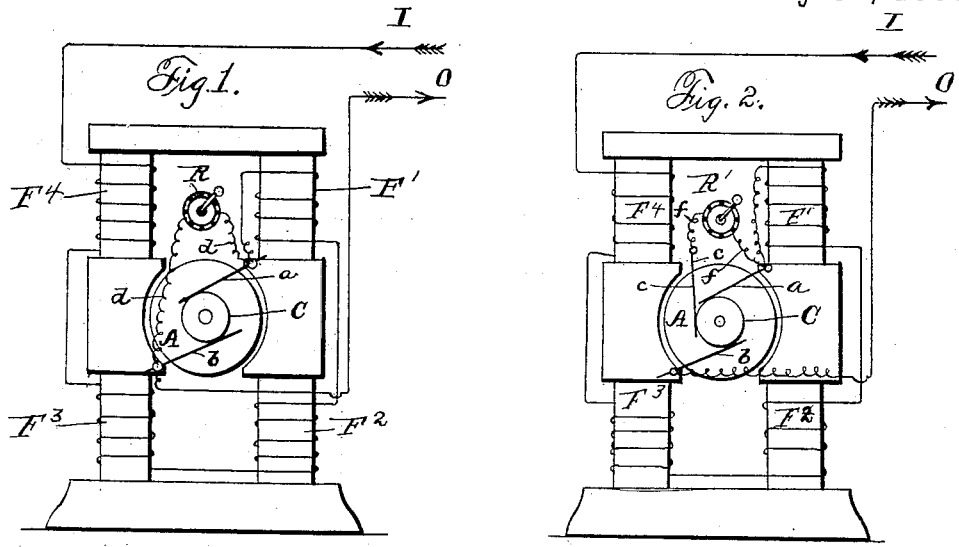
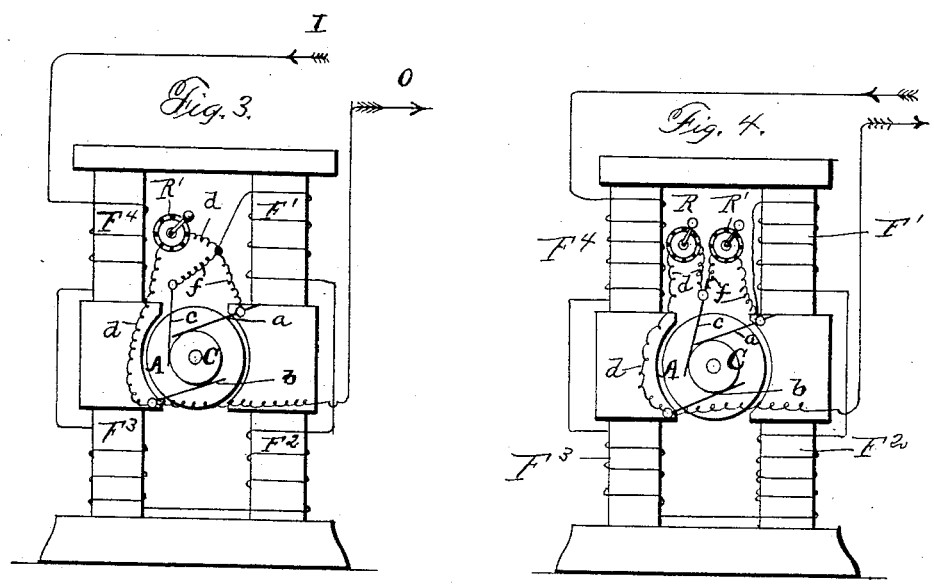
WITNESSES:
Ira R. Steward
G. W. Arndt
INVENTOR.
Addison G. Waterhouse
BY
Geo. H. Benjamin
ATTORNEY.

UNITED STATES PATENT OFFICE.

ADDISON G. WATERHOUSE, OF HARTFORD, CONNECTICUT, ASSIGNOR TO THE WATERHOUSE ELECTRIC AND MANUFACTURING COMPANY, OF SAME PLACE.

REGULATION OF ELECTRIC MOTORS.

SPECIFICATION forming part of Letters Patent No. 387,195, dated July 31, 1888.

Application filed November 30, 1887. Serial No. 256,551. (No model.)

*To all whom it may concern:*

Be it known that I, ADDISON G. WATERHOUSE, of the city of Hartford, State of Connecticut, have invented certain new and useful Improvements in Electric Motors, of which the following is a specification.

My invention relates to certain improvements in electric motors, whereby the speed of the motor may be so regulated that any given speed will be maintained irrespective of load or the work that the motor may be required to perform and independent of any changes in the strength of the current transmitted through the motor.

It is a well-known fact that electric motors generate an inverse current, which current flows in an opposite direction to that transmitted from the prime source, and that this current is proportional to the speed of the motor, acts in the nature of resistance to cut down the prime current, and limits the speed of the motor, thus impairing its efficiency.

The object of my invention is to utilize this counter-current to regulate the speed of the motor, and this I accomplish in the manner which I will now proceed to describe.

Referring to the diagrams, Figure 1 is a front elevation of a motor provided with two collecting-brushes and a resistance-coil interposed in a shunt-conductor connecting the two collecting-brushes. Fig. 2 is a similar view showing three collecting-brushes—two main and one auxiliary—and a resistance-coil in a shunt-conductor connecting one of the main brushes to the auxiliary brush. Fig. 3 is likewise a similar view showing three collecting-brushes, two of which are connected together by a conductor, and both to a third auxiliary brush by a conductor, in the circuit of which a resistance-coil is interposed. Fig. 4 is a similar view showing three brushes, pairs of which are connected together by conductors having resistance-coils interposed between the brushes.

In the drawings similar letters of reference indicate like parts.

The current from the prime source of supply is transmitted to the motor by the conductor I, and is carried around the field-magnets $F'$, $F^2$, $F^3$, and $F^4$, and is connected to the brush $a$, resting upon the commutator C of the armature A. The current traverses the coils of the armature to the brush $b$, and from thence back to the prime source of supply by the conductor O. The path of the main current in each of the four diagrams is the same.

Referring to Fig. 1, $d$ represents a conductor connected to the brush $a$ and to the resistance R, which for convenience may be made up of a number of coils, and can be either a fixed or an adjustable resistance, or any suitable device adapted to throw resistance into or out of the circuit, as required, and energized by a derived current from the main current or by a mechanical device connected to the armature or the moving part of the machine. The conductor $d$ is likewise connected to the brush $b$, and thus provides a path or shunt for a portion of the current around the armature.

The current from I upon reaching the brush $a$ divides between the armature helices and the shunt-path, and the division will be in proportion to the resistance of the two paths, it being understood that the counter electro-motive force generated in the armature and depending upon the speed of rotation of the armature is considered in the nature of resistance.

It will be understood that as all the current traverses the helices of the field-magnets before it reaches the armature the field-magnets are at all times fully magnetized and irrespective of whether the current is passing through the armature or through the shunt-conductor and resistance R, and hence the magnetism of the fields are preserved constant.

In designing a machine the resistance at R in the shunt-conductor is made high enough to cause a part of the current to flow through the armature, which will effect the rotation of the armature, and as speed of rotation increases a counter electro-motive force will be set up in the armature, which will oppose the passage of the current through it, and more of the current will in consequence flow around the resistance R.

It is found in practice that when the resistance of the armature and the shunt path or paths are properly proportioned any increase in the speed of the armature is practically balanced by the inverse electro-motive force set up, which will be slow as the resistance of the shunt is decreased and faster as it is increased, so that by varying the resistance at R different degrees of speed will be imparted to the armature.

In the diagram Fig. 2 $c$ is an auxiliary brush resting upon the commutator and in advance of the brush $a$, and electrically connected to $a$ by a conductor, $f$, and the interposed resistance-coil R′, which in all respects may be similar to that described in connection with Fig. 1. The current on conductor I in this case divides at the brush $a$, and passes through the conductor $f$ and resistance to brush $c$. One portion of the current traverses the helices of the armature between brushes $a$ and $b$ and the other portion from brush $c$ to $b$.

By the rotation of the armature a local current is set up between the brushes $a$ and $c$ and including the armature-coils between them. This local current increases with the speed of the armature, and serves to alter the position of the magnetic lines in the armature, thereby retarding its speed of rotation and practically limiting its speed to a determined velocity, which velocity may be increased or decreased by increasing or decreasing the resistance of R′.

The diagram Fig. 3 shows the shunt-path $d$ combined with the path of Fig. 2, the resistance-coil R′ being omitted from the path $f$. The current on I in this case is divided between three paths, two being by way of the brushes $a$ and $c$, through the armature-helices to the brush $b$, and the third path being a shunt around the armature through the resistance R.

In the form shown in Fig. 3 I have the local circuit of Fig. 2 and the shunt-circuit of Fig. 1. Variation of resistance of the shunt-path varies the current flowing through the armature and serves to effect a constant speed of rotation.

In the diagram Fig. 4 the brushes $a$ and $c$ are connected together as in Fig, 2, and the brushes $c$ and $b$ as in Fig. 1. In this form a very high resistance can be used between the brushes $a$ and $b$, thereby diverting most of the current through the armature. This gives to the motor all the power that is due to the current employed, and any desired speed may be obtained by adjusting the hand-resistance R′, which connects the brushes $a$ and $c$, so that by increasing the resistance R′ a greater speed will be maintained in the armature, and by lowering the resistance of R a slower speed will be produced.

I have shown but one auxiliary brush $c$, placed near the main brush $a$; but I may use two auxiliary brushes—one connected to $a$ and the other to $b$—the electrical connections being similar to those shown between the brushes $a$ and $c$. In this case I have a local circuit, as in Fig. 2, and a shunt-circuit from the auxiliary brush, with resistance in the local circuit and the shunt. By varying the resistance the current can be divided in any required proportion between the local circuit, the shunt-circuit, or the armature. In practice I find the form shown in Fig. 4 to be that which is the most efficient in practice and convenient of application.

I claim as my invention—

1. In an electric motor, the combination, with the field-magnet coils located in the main circuit, of a pair of main collecting-brushes, an auxiliary collecting-brush placed near one of said main brushes, a conductor for connecting one of said main brushes directly to the auxiliary brush, and an adjustable resistance located in the said conductor, substantially as and for the purpose described.

2. In an electric motor, the combination, with the field-magnet coils located in the main circuit, of a pair of main collecting-brushes, an auxiliary collecting-brush, a conductor for connecting one of said main brushes to said auxiliary brush, a conductor for connecting said auxiliary brush to the opposite main brush and around the armature of said motor, and a fixed or adjustable resistance in said last-named conductor, substantially as and for the purpose set forth.

3. In an electric motor, the combination, with the field-magnet coils located in the main circuit, of a pair of main collecting-brushes, an auxiliary collecting-brush, a conductor for connecting one of the main brushes to said auxiliary brush, a fixed or adjustable resistance in said conductor and between said brushes, a conductor for connecting said auxiliary brush to the opposite main brush around the armature, and a fixed or adjustable resistance included in said conductor between said brushes, substantially as and for the purpose set forth.

ADDISON G. WATERHOUSE.

Witnesses:
CHAS. E. CHAPIN,
SAMUEL O. PRENTICE.